(12) United States Patent
Patil

(10) Patent No.: US 10,609,189 B2
(45) Date of Patent: Mar. 31, 2020

(54) SEAMLESS STREAM FAILOVER WITH DISTRIBUTED MANIFEST GENERATION

(71) Applicant: Verizon Digital Media Services Inc., Dulles, VA (US)

(72) Inventor: Ravikiran Patil, Los Angeles, CA (US)

(73) Assignee: Verizon Digital Media Services Inc., Dulles, VA (US)

(*) Notice: Subject to any disclaimer, the term of this patent is extended or adjusted under 35 U.S.C. 154(b) by 75 days.

(21) Appl. No.: 15/898,852

(22) Filed: Feb. 19, 2018

(65) Prior Publication Data
US 2019/0260859 A1    Aug. 22, 2019

(51) Int. Cl.
*H04L 29/14* (2006.01)
*H04L 29/08* (2006.01)
*H04L 29/06* (2006.01)

(52) U.S. Cl.
CPC ............ *H04L 69/40* (2013.01); *H04L 65/601* (2013.01); *H04L 67/02* (2013.01); *H04L 65/4084* (2013.01); *H04L 65/80* (2013.01)

(58) Field of Classification Search
None
See application file for complete search history.

(56) References Cited

U.S. PATENT DOCUMENTS

| | | | |
|---|---|---|---|
| 10,177,965 B1* | 1/2019 | Joshi | H04L 41/0668 |
| 2011/0096828 A1* | 4/2011 | Chen | H04N 21/23106 375/240.02 |
| 2012/0072608 A1* | 3/2012 | Peters | H04L 65/4084 709/231 |
| 2013/0262693 A1* | 10/2013 | Phillips | H04N 21/222 709/231 |
| 2013/0332971 A1* | 12/2013 | Fisher | H04N 21/266 725/93 |
| 2016/0127440 A1* | 5/2016 | Gordon | H04N 21/23439 709/219 |
| 2016/0269459 A1* | 9/2016 | Harden | H04L 65/602 |

* cited by examiner

*Primary Examiner* — Scott B Christensen
(74) *Attorney, Agent, or Firm* — Ansari Katiraei LLP; Arman Katiraei; Sadiq Ansari

(57) ABSTRACT

A device for seamlessly distributing a media stream from different ingest devices of a delivery platform. The device fails over from a first ingest device to a second ingest device in response to one or more errors from attempts to retrieve parts of the media stream from the first ingest device prior to any signaling or messaging (e.g., an unpublish event) from the first ingest device indicating that the media stream has ended, is no longer available, or is otherwise removed from the first ingest device. The device also produces manifests identifying two or more bitrates for a media stream when each of the two or more bitrates is uploaded to and ingested by a different ingest device of the delivery platform.

18 Claims, 7 Drawing Sheets

SEAMLESS STREAM FAILOVER WITH DISTRIBUTED MANIFEST GENERATION

BACKGROUND ART

A media stream is video, audio, text, game, interactive, and/or other digital media content with a duration that spans an interval of time. Streaming such media content (i.e., a media stream) over the Internet to multiple clients is complex and resource intensive.

A stream provider originates (e.g., creates or generates) the media content for the media stream and uses one or more encoders to encode the media content into segments. Each segment encodes a short duration of the overall media content. The stream provider, via the encoder or other publishing tool, uploads the segments to an ingest device of a delivery platform. The ingest device ingests the segments of a media stream in order to make those segments available for redistribution by streaming devices of the delivery platform. The delivery platform may be operated by the stream provider, a content delivery network (CDN), or other third-party cloud operator with distributed resources for wide-scale distribution of the media stream.

Ingest devices can simultaneously ingest into the delivery platform, multiple streams from one or more stream providers, including multiple different bitrates or quality encodings of the same stream. Resources of the ingest device are mainly allocated for the ingest of media streams into the delivery platform. The streaming devices offload the distribution overhead by providing a fan-out distribution of the media streams from the ingest device to requesting client devices.

The streaming devices may be located in different geographic regions. The streaming devices may have a cache into which they store some segments of a media stream temporarily. Requests for the same segments by different client devices can then be served by a streaming device based on a single retrieval from an ingest device, rather than each client request causing a retrieval to the ingest device.

The ingest devices can, however, become a single point of failure that disrupts the entire delivery of a media stream if that media stream is published to one ingest device. In other words, should the ingest device fail, the streaming devices have no place from which to retrieve and distribute segments for the media streams that were uploaded to that ingest device.

For redundancy reasons, the delivery platform provides two or more ingest devices, in the same or different locations. Stream providers may upload their stream segments to two or more ingest devices of the delivery platform.

Upon receiving some part of a new media stream (e.g., media stream segment, manifest, metadata, or other data), an ingest device may issue a publish event that notifies the streaming devices about the availability of the media stream from that ingest device. Upon receiving requests for the new media stream, the streaming devices can retrieve the requested segments from the one or more ingest devices that issued the publish event for that media stream.

Although redundancy is provided, the problem with this approach is that overhead is placed on the ingest devices to also manage the removal or deletion of the media streams from the delivery platform. Thus, in addition to sending the publish events, the ingest devices also send unpublish events when media streams are no longer available. The unpublish event notifies the streaming devices that a media stream is no longer available and that the streaming devices should not attempt retrieval of that media from the ingest devices issuing the unpublish event.

A failure at an encoder, an ingest device, or the network pathways connecting the encoders, ingest devices, and streaming devices can prevent the unpublish events from reaching the streaming device or prevent the unpublish events from even being generated at the appropriate times. If the ingest of a particular media stream to a first ingest device fails or is temporarily interrupted, the first ingest device sends the unpublish event to the streaming devices that can then failover to a redundant second ingest device to which the particular media stream may also be published (without interruption). However, without the unpublish event, the streaming devices continue to request segments of the particular media stream from the first ingest device. This can lead to several seconds of stream outage and interruption of stream playback on client devices.

A further problem is manifest generation for media streams uploaded to the delivery platform. The manifest instructs client players as to the next segments of a media stream and where those segments are available (e.g., the Uniform Resource Locator for requesting the segments). Additionally, the manifest identifies different bitrates or quality encodings at which the same stream is available for playback. Currently, the ingest devices generate the manifests based on the ingested stream segments. In order to identify the different bitrates for a stream in the manifest, the ingest device generating the manifest has to receive the stream segments at each of the different bitrates. This, however, can lead to disproportionate load distribution across the ingest devices as one ingest device may be tasked with ingesting multiple media streams that each have multiple bitrate encodings, while another ingest device is tasked with ingesting multiple media streams that each have a single bitrate encoding. The disproportionate load distribution can overload the ingest devices and cause them to fail. Also, the generation of the master manifest containing the different bitrates of a media stream is additional overhead that is placed on the ingest devices.

DETAILED DESCRIPTION

This disclosure is directed to systems and methods for seamless stream failover with distributed manifest generation. The seamless stream failover enables distribution devices (e.g., streaming devices and/or other devices, servers, or machines that distribute media streams) of a delivery platform to switch retrieval of a particular media stream from a first ingest device (e.g., media stream origin source) to a different second ingest device of the delivery platform prior to any signaling or messaging (e.g., an unpublish event) from the first ingest device indicating unavailability of the particular media stream at the first ingest device. In particular, the distribution device may initiate the switch on its own in response to one or more failed attempts to retrieve the parts of the particular media stream from the first ingest device, wherein the second ingest device is a redundant origin source for the particular media stream. The distributed manifest generation produces manifests identifying two or more bitrates for a particular media stream even when each of the two or more bitrates is uploaded to and ingested by a different ingest device of the delivery platform. The distributed manifest generation shifts part of all of the manifest generation from the ingest devices to the distribution devices of the delivery platform.

Figure 1:
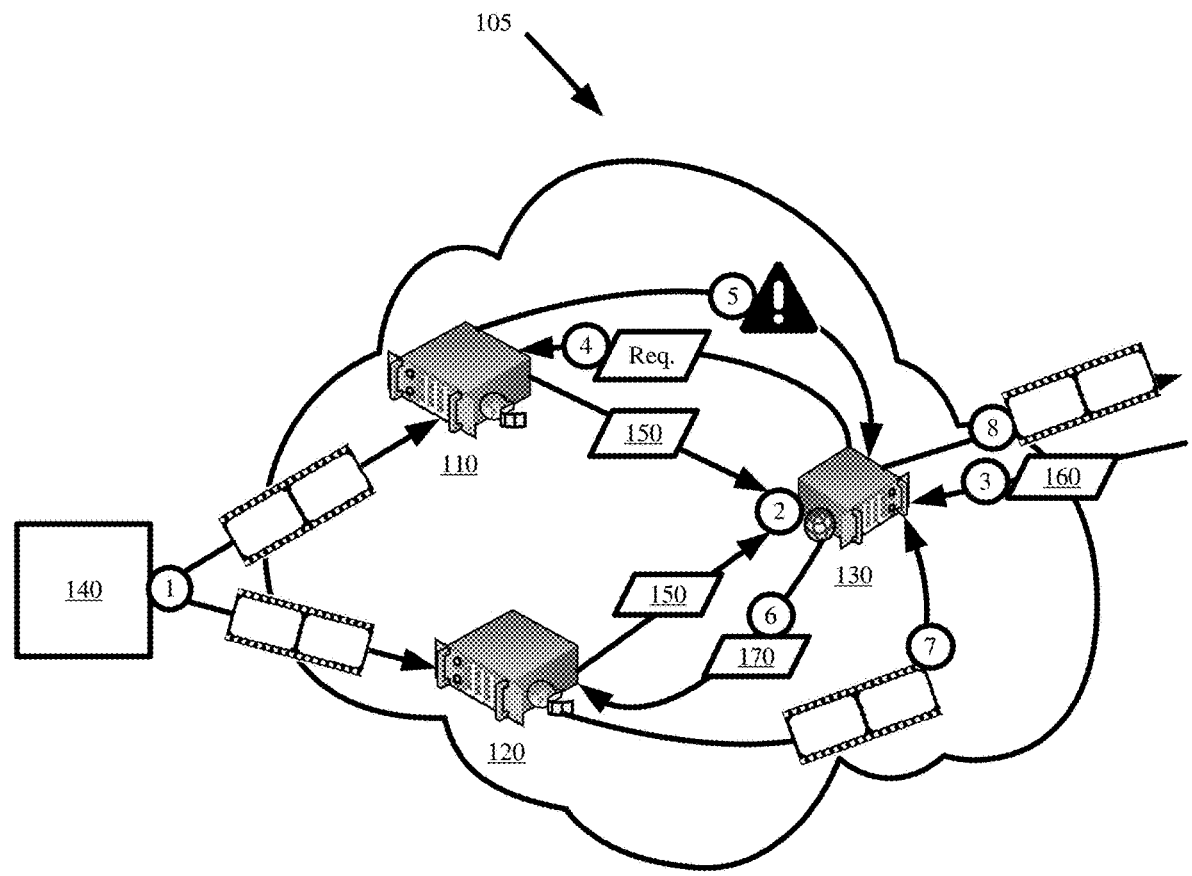
FIG. 1 provides a conceptual overview for seamless stream failover in accordance with some embodiments.

FIG. 1 provides a conceptual overview for seamless stream failover in accordance with some embodiments. The figure illustrates a delivery platform 105 with at least a first ingest device 110, a second ingest device 120, and a distribution device 130. A single distribution device 130 is shown for illustrative purposes. The delivery platform 105 may deploy several such distribution devices and additional ingest devices in addition to those depicted in FIG. 1.

A stream provider 140, using one or more encoders or other media stream publishing tools, publishes or uploads a media stream to the first ingest device 110 and the second ingest device 120 for redundancy. Publishing the media stream may involve sending metadata for various attributes of the media stream (e.g., name, codec, bitrate, length, etc.) and I-frame (or key frame) aligned segments of the media stream to each of the first ingest device 110 and second ingest device 120.

In response to starting ingest of the media stream, the first ingest device 110 and the second ingest device 120 provide a publish event message 150 to the distribution device 130. Each publish event message 150 indicates that the media stream is available for redistribution from one of the first ingest device 110 or the second ingest device 120 sending the message 150.

The publish event messages 150 inform the distribution device 130 as to the locations for the redundant copies of the media stream in the delivery platform 105. Accordingly, when the distribution device 130 subsequently receives requests for a first set of segments or other parts of the media stream from within or outside the delivery platform 105, the distribution device 130 selects one of the first and second ingest devices 110 and 120, and, retrieves the first set of segments or parts of the media stream from the selected ingest device.

The stream provider 140 continues uploading a second set of segments of the media stream to the first ingest device 110 and the second ingest device 120. The first ingest device 110 experiences a failure or becomes unresponsive during the upload of the second set of segments. For example, the first ingest device 110 may receive the second set of segments from the stream provider, but may be unable to communicate with the distribution device 130. Accordingly, no unpublish event message is provided by the first ingest device 110 to the streaming device 130.

The distribute device 130 receives a request 160 for one or more of the second set of segments. The distribution device 130 attempts to retrieve those segments from the first ingest device 110 (e.g., the selected ingest device in this figure) by issuing request 160 or its own subrequest for one or more of the second set of segments.

The request from the distribution device 130 returns with an error (e.g., HyperText Transfer Protocol (HTTP) 404 "Not Found" message). It is important to note that the HTTP 404 "Not Found" error and other errors are different than unpublish event messages. Unlike the unpublish event messages, the HTTP 404 "Not Found" error and other errors (e.g., HTTP 408 "Request Timeout", HTTP 503 "Service Unavailable", HTTP 504 "Gateway Timeout", etc.) do not indicate that the media stream is no longer available at the first ingest device 110 or that the media stream has been removed from the first ingest device 110. Rather, these errors indicate that there was an issue in retrieving a part of the media stream from the first ingest device 110.

In implementing the seamless stream failover, the distribution device 130 does not return the error(s) to the requestor. Instead, in response to one or more of the errors from the first ingest device 110, the distribution device 130 switches to the second ingest device 120 (based on the publish event provided by the second ingest device 130 indicating that the second ingest device 130 is a redundant ingest point for the media stream). The distribution device 130 issues a subrequest 170 for the same media segment parts originally requested with request 160 in response to the one or more returned errors from the first ingest device 110.

In response to the subrequest 170, the distribution device 130 receives the second set of segments from the second ingest device 120. The distribution device 130 then distributes the segments to the requestor.

Due to the seamless stream failover, the requestor is unaware of any error or failover (because the distribution device 130 does not return the errors to the requestor), and the requestor did not rerequest the segments. By switching over to the second ingest device 120 prior to an unpublish event or other messaging from the first ingest device 110 indicating that the media stream is no longer available at the first ingest device 110, the distribution device 130 avoids interrupting playback of the media stream at the requestor that would have otherwise resulted had the distribution device 130 repeatedly attempted to retrieve the second set of segments from the first ingest device 110 or the distribution device 130 returned the errors to the requestor and the requestor had to reissue its requests.

Figure 2:
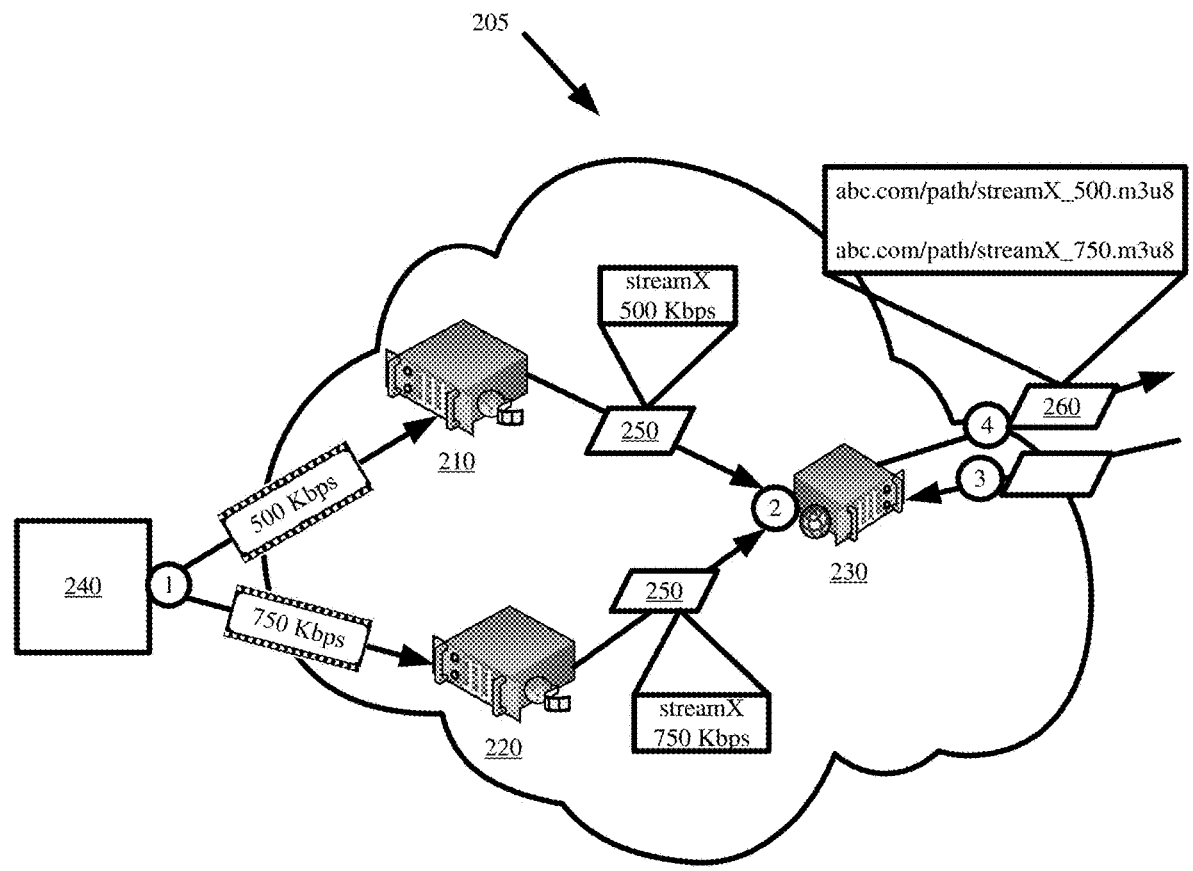
FIG. 2 provides a conceptual overview for the distributed manifest generation in accordance with some embodiments.

FIG. 2 provides a conceptual overview for the distributed manifest generation in accordance with some embodiments. The figure illustrates a delivery platform 205 with at least a first ingest device 210, a second ingest device 220, and a distribution device 230. Delivery platform 205 may be the same delivery platform as delivery platform 105 from FIG. 1 or a different delivery platform.

A stream provider 240, using one or more encoders or other media stream publishing tools, publishes or uploads segments of a media stream encoded at a first bitrate to the first ingest device 210, and segments of the media stream encoded at a different second bitrate to the second ingest device 220, wherein the different bitrates can be defined based on one or more of the media stream bandwidth, resolution, quality, codec, or other parameters of the media stream.

The ingest devices 210 and 220 provide a publish event message 250 to the distribution device 230 upon receiving the stream segments at the different bitrates. Each publish event message 250 notifies the distribution device 230 that a different bitrate for the same media stream is available at a different ingest device.

The distribution device 230 produces a manifest 260 from the different publish event messages 250 provided by the ingest devices 210 and 220. In this figure, the distribution device 230 generates a master manifest 260 from the different publish event messages 250, wherein the master manifest 260 identifies Uniform Resource Locators (URLs), links, or other addressing for requesting bitrate specific manifests for different available bitrates of the media stream. Each bitrate specific manifest provides the URLs, links, or other addressing for requesting segments of the media stream at a particular bitrate. In some embodiments, the master manifest 260 may enumerate each bitrate for the media stream, and list one or more URLs, links, or other addressing with which to request one or more segments of the media stream at each identified bitrate.

The manifest 260 is provided from the distribution device 230 to other devices (e.g., client devices) that request the media stream (in response to an initial request or request for the manifest). Based on the publish event messages from the first and second ingest devices 210 and 220, the distribution device 230 can select a correct ingest device and retrieve requested segments of the media stream at a particular bitrate from the corresponding ingest device to which segments at the particular bitrate are uploaded, even when the requests for the segments at the different bitrates do not include URL, links, or other addressing to differentiate at which ingest device those segments are stored.

Figure 3:
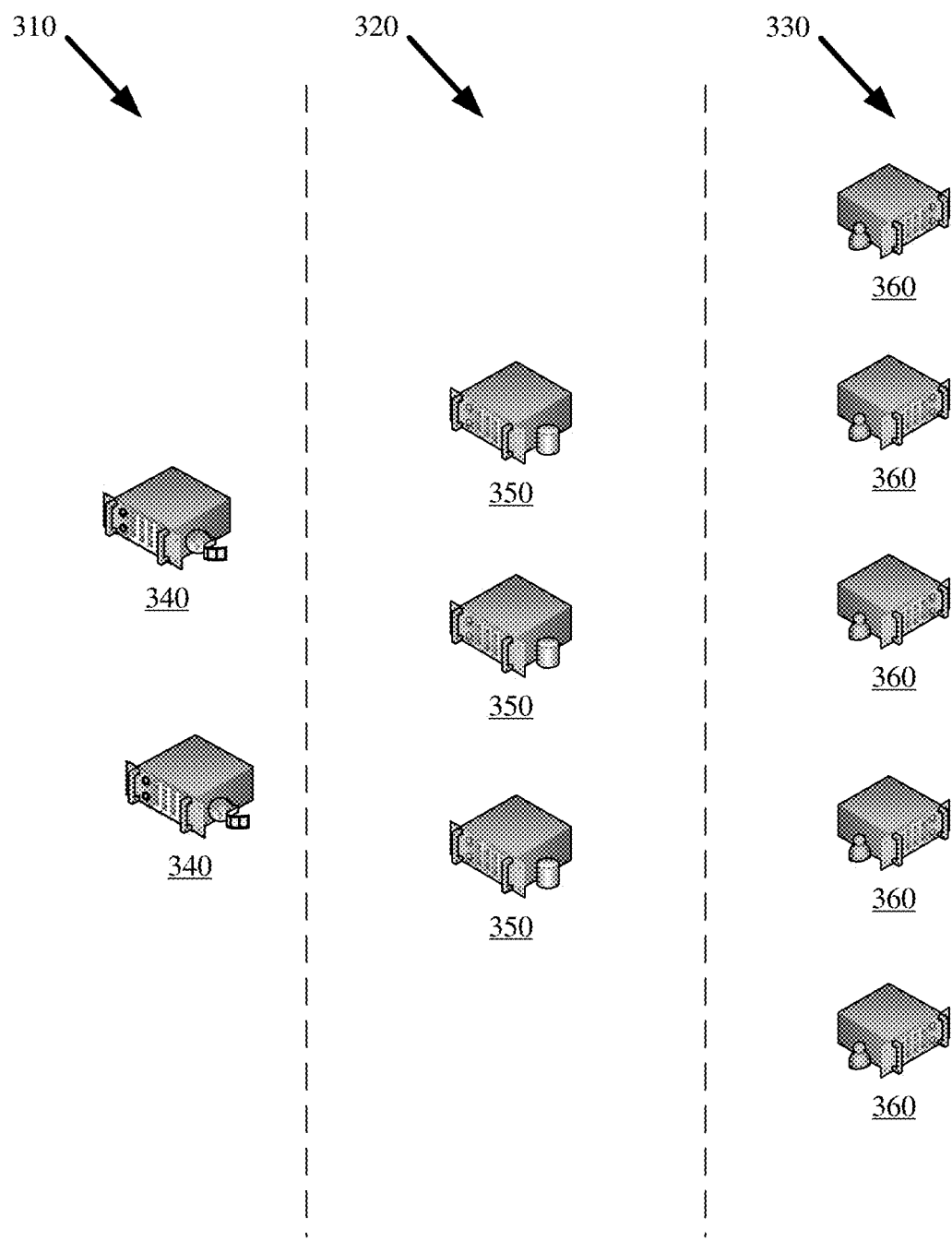
FIG. 3 illustrates an exemplary delivery platform architecture for performing the seamless stream failover and distributed manifest generation of some embodiments.

FIG. 3 illustrates an exemplary delivery platform architecture 300 for performing the seamless stream failover and distributed manifest generation of some embodiments. In this example, the architecture 300 has three tiers 310, 320, and 330.

The first tier 310 includes two or more ingest devices 340 of the delivery platform. The two or more ingest devices 340 in the first tier 310 may be collocated or geographically distributed to different network locations. By geographically distributing the ingest devices 340, the delivery platform can have different ingest devices 340 closer to different stream providers. This reduces the number of network hops the uploaded media stream segments traverse before entry into the delivery platform, which, in turn, reduces the potential points of failure and performance issues that may affect the upload. The ingest devices 340 may represent Adobe Flash Media servers or other network enabled machines that act as origin sources for a subset of media streams that are available for redistribution from the delivery platform, and more specifically, stream segments, uploaded from or published by encoders and other stream uploading or publication tool.

Each ingest device 340 is capable of simultaneously or contemporaneously ingesting multiple media streams or stream bitrates. The Real Time Messaging Protocol (RTMP) is one of many network protocols by which the ingest devices 340 ingest media streams from stream providers over a digital network, such as the Internet. The ingest devices 340 may serve as defacto origin sources of the delivery platform from which the media streams are fanned-out, and ultimately, distributed to client devices requesting the media streams from the delivery platform. In some embodiments, the ingest devices 340 are origin sources operated outside the delivery platform by the stream providers.

In response to ingesting a media stream with a particular ingest device 340, that particular ingest device 340 provides a publish event message to the devices 350 in the second tier 320. In some embodiments, the publish event message identifies the media stream and the location within the delivery platform (e.g., the particular ingest device 340) where the media stream is available, thereby notifying the devices 350 in the second tier 320 where different media streams can be accessed from within the delivery platform for redistribution within and outside the delivery platform. The publish event message may provide a Uniform Resource Locator (URL) with the stream identification and location information. The publish event message may, in addition or in lieu of the URL, provide an identifier for the media stream (e.g., stream name) and an address (e.g., Internet Protocol (IP) address) of the ingesting ingest device 340. The ingest devices 340 may be configured with the addressing of each of the devices 350 in the second tier 320 that are to receive the publish event message or may broadcast or multicast the publish events to the devices 350 in the second tier 320.

The ingest devices 340 are also configured to provide an unpublish event message to the second tier 320 devices 350 when a media stream has ended, is no longer available, or is otherwise removed from an ingest device 340 to which the media is originally published. For example, when a live stream ends, the ingest device 340 should provide the unpublish event to notify the devices 350 in the second tier 320 that the live stream has ended and is no longer available from that ingest device 340.

However, the unpublish event message may not always be sent to or reach the second tier 320 as a result of encoder failure, a network failure, ingest device 340 failure, user error, or other failures and errors. The seamless stream failover resolves the issues and other delays associated with failover that is dependent on the unpublish event message or other signaling that originates from the ingest devices 340 and that indicates that a particular media stream has ended, is no longer available, or is otherwise removed from the first tier 310.

The distribution device 130 from FIG. 1 and/or the distribution device 230 from FIG. 2 are representative of the devices in one or both of the second tier 320 and the third tier 330 of the exemplary delivery platform architecture of FIG. 3. In other words, functionality from a device 350 in the second tier 320 and a device 360 in the third tier 330 can be combined to implement the distribution device 130 or 230. The functionality can also be separated such that device 350 and device 360 perform similar or different operations. The separation of the distribution device functionality into separate tiers 320 and 330 scales the delivery platform so that it may support ingesting of larger number of media streams while also supporting the distribution of media streams to larger numbers of devices outside the delivery platform.

As shown in FIG. 3, the second tier 320 includes two or more mid-tier devices 350. Like the ingest devices 340, the mid-tier devices 350 may be collocated or geographically distributed to different network locations that are adjacent to one or more of the ingest devices 340.

The mid-tier devices 350 may be network enabled machines that distribute stream segments from the first tier 310 across the third tier 330. The mid-tier devices 350 may also track media stream availability and accessibility information based on the publish event messaging from the ingest devices 340. In other words, the mid-tier devices 350 track which media streams have been published to which ingest devices 340, including which bitrates of a particular media stream are published to which ingest devices 340. The mid-tier devices 350 also prioritize media stream retrieval based on their network proximity to one or more ingest devices 340. Thus, if a particular media stream is published to first and second ingest devices 340, and a mid-tier device 350 receives a request for the particular media stream, the mid-tier device 350 retrieves the particular media stream from the first ingest device 340 when the mid-tier device 350 is closer to the first ingest device 340 (e.g., fewer network hops, is geographically proximate to, or can access the first ingest device 340 with lowest latency), and retrieves the particular media stream from the second ingest device 340 when the mid-tier device 350 is closer to the second ingest device 340.

The mid-tier devices 350 may include memory or storage that operates as a cache. A mid-tier device 350 may locally store stream segments or manifests retrieved and distributed by that mid-tier device 350 in response to first requests for those stream segments or manifests. The same stream segments or manifests can then be distributed from the cache in response to subsequent requests for those stream segments or manifests without subsequent retreivals from the ingest devices 340.

The mid-tier devices 350 also track when media streams are no longer available based on unpublish event messages from the ingest devices 340, and, in embodiments for seamless stream failover, upon various errors resulting from attempted retrieval of media streams from one or more ingest devices 340, wherein the errors, unlike the unpublish event messaging, do not indicate that the corresponding media streams have ended, are no longer available, or have otherwise been removed from the ingest devices 340. Rather, the errors indicate that there was an issue, unrelated to stream availability, in communicating with or retrieving from an ingest device 340.

The mid-tier devices 350 may also generate and distribute manifests (e.g., master manifests and other manifests) for media streams that are published to one or more ingest devices 340 in accordance with the embodiments for distributed manifest generation. In particular, the mid-tier devices 350 generate and distribute manifests that include different bitrates of the same media stream with the segments encoded at the different bitrates being published to different ingest devices 340.

The third tier 330 includes two or more streaming devices 360. The streaming devices 360 are distributed across the delivery platform. In particular, the streaming devices 360 are distributed for geographic or network proximity to different sets of client devices. The streaming devices 360 are network enabled machines that distribute the media streams uploaded to the delivery platform to requesting client devices. In particular, the streaming devices 360 operate in conjunction with the mid-tier devices 350 to provide the fan-out of the media streams ingested by the ingest devices 340 to large numbers of client devices in different geographic regions. As noted above, the mid-tier devices 350 may be integrated with the streaming devices 360 to provide the combined functionality of the above referenced distribution devices. Otherwise some functionality of the distribution devices is implemented by the mid-tier devices 350 and other functionality by the streaming devices 360.

The client devices request media streams that are uploaded to the delivery platform. Each client device request may be an HTTP GET request with a URL that identifies the requested media stream, and more specifically, one or more segments and/or manifests of the media stream. The client device requests can take other forms and be transmitted using different protocols, such as HTTP Live Streaming (HLS), HTTP Dynamic Streaming (HDS), Moving Pictures Experts Group Dynamic Adaptive Streaming over HTTP (MPEG-DAHS), and Real Time Streaming Protocol (RTSP) as some examples. The client device requests may be distributed to the closest streaming devices 360 based on Domain Name System (DNS) request resolution, Anycast routing, or other request distribution schemes.

In response to receiving a client device request for a particular media stream (e.g., one or more segments and/or manifests of the particular media stream), the streaming device 360 requests the particular media stream from a selected mid-tier device 350 in the second tier 320. In some embodiments, the streaming device 360 selects the mid-tier device 350 based on proximity between the streaming device 360 and available mid-tier devices 350, performance (e.g., latency, throughput, or responsiveness) of the mid-tier devices 350, and/or network performance (e.g., latency, packet loss, jitter, or bandwidth). The mid-tier device 350 selection may also be based on a request distribution scheme, such as the Cache Array Routing Protocol, in which a hash or other processing of the request URL selects one of the available mid-tier devices 350. In some such scenarios, the streaming devices 360 are configured with the mid-tier device 350 addressing and the hash result selects one of the addresses.

The streaming device 360 responds to a client device request by distributing stream segments or manifests requested by a requestor to that requestor upon retrieval from the selected mid-tier device 350. The streaming devices 360 may include memory or storage that operates as a cache. The streaming devices 360 may locally store stream segments or manifests that are distributed to a first client device so that the same stream segments or manifests can be distributed to other requesting client devices without subsequent retrieval from the mid-tier devices 350.

Figure 4:
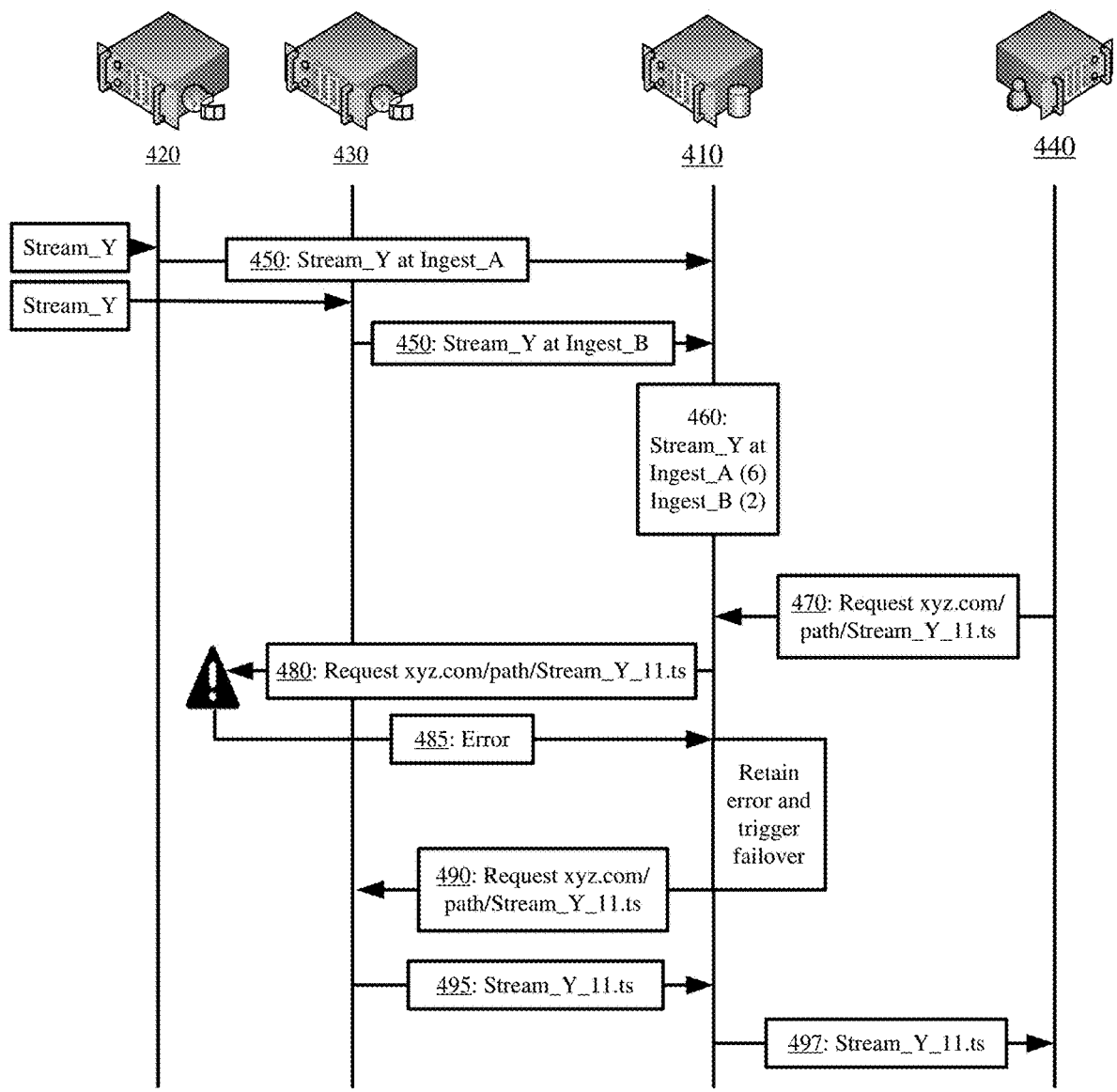
FIG. 4 conceptually illustrates the seamless stream failover at a mid-tier device in accordance with some embodiments.

FIG. 4 conceptually illustrates the seamless stream failover at a mid-tier device in accordance with some embodiments. The figure illustrates a mid-tier device 410, a first ingest device 420, a second ingest device 430, and a streaming device 440.

The mid-tier device 410 receives (at 450) a publish event from each of the first ingest device 420 and the second ingest device 430. Here again, the publish events are provided in response to the same particular media stream being redundantly uploaded to the first and second ingest devices 420 and 430. Each publish event identifies at least an identifier for the particular media stream (e.g., name or URL) and an identifier for the ingest device 420 to which the particular media stream is uploaded (e.g., network address or URL). Each publish event may also identify the time of the particular media stream upload and/or other timing or encoding information relating to segments of the particular media stream.

The mid-tier device 410 enters the publish event data into an internal table 460. The internal table 460 is a data structure or database with which the mid-tier device 410 tracks stream accessibility and/or availability information. In particular, the internal table 460 identifies the media streams that are currently available for distribution in the delivery platform and the ingest devices where those media streams can be accessed. Each mid-tier device 410 may mange its own internal table 460. The internal table 460 can also be a table that is shared by a set of mid-tier devices in a point-of-presence of the delivery platform. As shown, the internal table 460 associates a number or weight with each entry in the table 460. The weight can be used to prioritize access to the first and second ingest devices 420 and 430. The weight can be based on the proximity of the mid-tier device 410 to the first and second ingest devices 420 and 430 or performance (e.g., latency, packet loss, and bandwidth) of the first and second ingest devices 420 and 430 to the mid-tier device 410.

At a later time, the mid-tier device 410 receives (at 470) a request directed to the particular media stream from the streaming device 440. The request may be generally directed to the particular media stream, or specifically directed to a segment or manifest of the particular media stream. For instance, the request may contain a URL with a domain name resolving to the delivery platform, a path, and a stream, segment, or manifest name (e.g., name with a *.ts extension for a specific segment or *.m3u8 for a manifest). Assume that in this example the request is directed to a first segment of the particular media stream. The request may originate from a client device and the request routes to the streaming device 440. The streaming device 440 may determine that the segment requested by the request is not locally cached, and therefore, provides (at 470) the request (e.g., by forwarding the request or by issuing a new subrequest for the segment of the request) to the mid-tier device 410 after selecting the mid-tier device 410 based on a hash of the request URL and/or performance between the streaming device 440 and the mid-tier device 410.

In response to receiving (at 470) the request, the mid-tier 410 scans the internal table 460 to determine whether the requested media stream is available at one of the ingest devices. In this example, the request 460 is directed to the particular media stream that is indicated to be available at the first and second ingest devices 420 and 430 based on the publish event messaging, without corresponding unpublish event messaging, from each of the first and second ingest devices 420 and 430. The internal table 460 entries for the particular media stream associate greater weight to the first ingest device 420 than the second ingest device 430. Accordingly, the mid-tier device 410 attempts to retrieve the requested segment from the first ingest device 420 by passing (at 480) a request for the segment over the digital network to the first ingest device 420.

A failure, such as a failure in the network, on the encoder publishing the stream segments to the first ingest device 410, or on the first ingest device 410, causes an error, rather than the requested segment, to be returned (at 485) to the mid-tier device 410. For instance, the mid-tier device 410 may receive an HTTP 404 "Not Found" error in response to sending the request for the particular media stream segment to the first ingest device 420. Other error messages or response codes may additionally or alternatively be returned to the first ingest device 420 (e.g., HTTP 408 "Request Timeout", HTTP 503 "Service Unavailable", HTTP 504 "Gateway Timeout", etc.). Again, it is important to emphasize that these errors do not indicate that the particular media stream has ended, is no longer available, or is otherwise removed from the first ingest device 420 as would an unpublish event message or other similar messaging from the first ingest device 420. The returned error (at 485) indicates that there was an issue contacting or communicating with the first ingest device 420.

Ordinarily, the mid-tier device 410 would return the error to the streaming device 440, and the streaming device 440 would propagate the error back to the original requestor (e.g., a requesting client device). The client device could reissue the request, but in most cases, the sequence would cause an interruption in the playback of the particular media stream on the client device. Since there was no unpublish event from the first ingest device 420 to the mid-tier device 410 to remove the corresponding entry for the particular media stream from the internal table 460, the mid-tier device 410 would continue to attempt retrieving the requested segment from the first ingest device 420 even though the failure may persist.

The disclosed embodiments for seamless stream failover override the dependence of the mid-tier device 410 on an unpublish event or other failover messaging (explicitly indicating that a stream has ended, is unavailable, or has been otherwise removed) from the first ingest device 420. As part of the seamless stream failover, the mid-tier device 410 may perform a lookup in the table 460 for a backup ingest device where the particular media stream has also been published. In this case, the second ingest device 420 is identified as a backup origin for the particular media stream in the table 460. Instead of forwarding, to the streaming device 440, the error that results from the request for the stream segment that was made to the first ingest device 420, the mid-tier device 410 retains the error and issues (at 490) a subrequest for the stream segment to the second ingest device 430. In other words, the mid-tier device 410 fails over from the first ingest device 420 to the second ingest device 430 without receiving an unpublish event from the first ingest device 420 and/or without the upstream streaming device 440 being notified of the error.

In response to the issued subrequest, the mid-tier device 410 receives (at 495) the requested stream segment from the second ingest device 420, and forwards (at 497) the segment to the streaming device 440 in response to the original request received (at 470) from the streaming device 440. In this manner, the failover occurs seamlessly as the streaming device 440 and requesting client device do not experience delay with receiving the error and resubmitting the request one or more times back to the mid-tier device 410 and the ingest devices 420 or 430. Consequently, there is a high likelihood that the particular media stream playback on the client device will not be interrupted because the failover performed by mid-tier device 410 can complete before buffered segments of the particular media stream at the client device are rendered. If no failover ingest device is available or all failover ingest devices have been attempted without success, the mid-tier device 410 may return, to the streaming device 440, the one or more errors the mid-tier device 410 received from one or more of the attempted ingest devices.

Some embodiments condition activation of the seamless stream failover. The conditional activation, for example, prevents premature failover when requests arrive before stream segments have been uploaded to the ingest devices. For instance, an encoder may signal an ingest device of a new media stream, causing the ingest device to distribute the publish event for that media stream to the mid-tier devices. However, it may take, for example, three seconds before a first segment of the media stream is ingested by the ingest device (e.g., when the first segment encodes the first three seconds of the stream). In the time it takes for the first segment to be uploaded, a request for the first segment may arrive at the mid-tier device. The mid-tier device may attempt to retrieve the first segment from the ingest device based on the publish event from the ingest device. The ingest device would return an error to the mid-tier device, because the upload of the first stream segment has not yet completed. The error could activate the seamless stream failover prematurely, thereby resulting in an unnecessary failover to a more distant or slower ingest device.

The conditional activation prevents this and other premature failover. The activation of the seamless stream failover may be conditioned on the mid-tier device successfully retrieving at least one segment or manifest from an ingest device after receiving a publish event for the corresponding media stream from the ingest device and before failing over and away from that ingest device during a subsequent retrieval of a segment or manifest of that media stream.

In some embodiments, the mid-tier device may update a state for the entry of a corresponding media stream in the internal table 460 in response to successfully retrieving one or more first segments or manifests of the media stream, wherein a successful retrieval can be indicated upon receiving the request segment or manifest, or upon receiving successful responses (e.g., HTTP 200 "OK") from a particular ingest device. Updating a particular media stream entry in the internal table of the mid-tier server may indicate that streaming for that particular media stream has commenced from the particular ingest device.

In response to updating a particular media stream entry for a particular ingest device, the mid-tier device then activates the seamless failover for that particular media stream at the particular ingest device. A subsequent retrieval for a segment or manifest of that particular media stream from the particular ingest device that produces an error from the particular ingest device, causes the retrieving mid-tier device to automatically failover to a different ingest device (when available).

The seamless stream failover is not activated at a mid-tier device if the mid-tier device receives an error from a particular ingest device prior to the mid-tier device successfully receiving any segments or manifests for the particular media stream from the particular ingest device. In response to the error and the failover being inactive, the mid-tier device may not failover to a different ingest device and may continue requesting the stream, stream segments, or stream manifests from the primary ingest device. In such cases, the mid-tier device may delay for some amount of time before retrying the request to the same ingest device. The mid-tier device may also return the error(s) to the original requestor.

A different threshold number of successful retrievals for conditionally activating the seamless failover may be specified for different media streams, stream providers, or ingest devices. For example, a mid-tier device may activate the seamless stream failover from a first ingest device for a particular media stream after three successful retrievals of segments, manifests, metadata, and/or other parts of the particular media stream from the first ingest device, and may activate the seamless stream failover from a second ingest device for the particular media stream after one successful retrieval of a segment, manifest, metadata, or other part of the particular media stream from the second ingest device. Similarly, the mid-tier device may activate the seamless stream failover from a particular ingest device for a first media stream after two successful retrievals of segments, manifests, metadata, and/or other parts of the first media stream from the particular ingest device, and may activate the seamless stream failover from the particular ingest device for a different second media stream after four successful retrievals of segments, manifests, metadata, and/or other parts of the second media stream from the particular ingest device.

Some embodiments avoid continually performing the seamless stream failover because a primary ingest device or a stream ingested thereon remains unavailable or inaccessible after some period of time. Continual failover from a first ingest device to a second ingest device may be due to the internal table of the mid-tier device retaining the first ingest device as the primary ingest device. In such cases, the mid-tier device continually fails over from the first ingest device to the second ingest device when the mid-tier device receives requests for different segments or manifests of the same stream or requests from different client devices that are directed to the same stream, and attempts to satisfy those requests through retrievals to the first ingest device that return errors in response to each attempt. The stale entries for a particular media stream in the internal table of the mid-tier devices can be due to improper publishing of the mid-tier devices by the particular stream provider or encoders of the particular media stream provider. For instance, the encoders may be configured to send incorrectly formatted unpublished event messages that cannot be processed by the ingest device, configured to not send any unpublish event messages, or their unpublish event messages are lost or unreadable by the ingest devices. In such cases, the entries for the particular media stream remain in the internal table of a mid-tier device and are not removed even though the particular media stream may have ended, is no longer available, or has been otherwise removed.

Accordingly, some embodiments perform automatic removal of stale media streams on an ingest device by operation of the mid-tier devices or distribution devices of the delivery platform. The mid-tier device or distribution devices perform the automatic removal of the stale media streams on an ingest device without any unpublish events or other media stream removal messaging from the ingest device.

The automatic removal of stale media streams may be based on one or more thresholds configured on the mid-tier devices and/or distribution devices. The thresholds may provide a count for a consecutive number of errors before a corresponding entry for the stale or failing media stream is removed from the device internal table.

Figure 5:
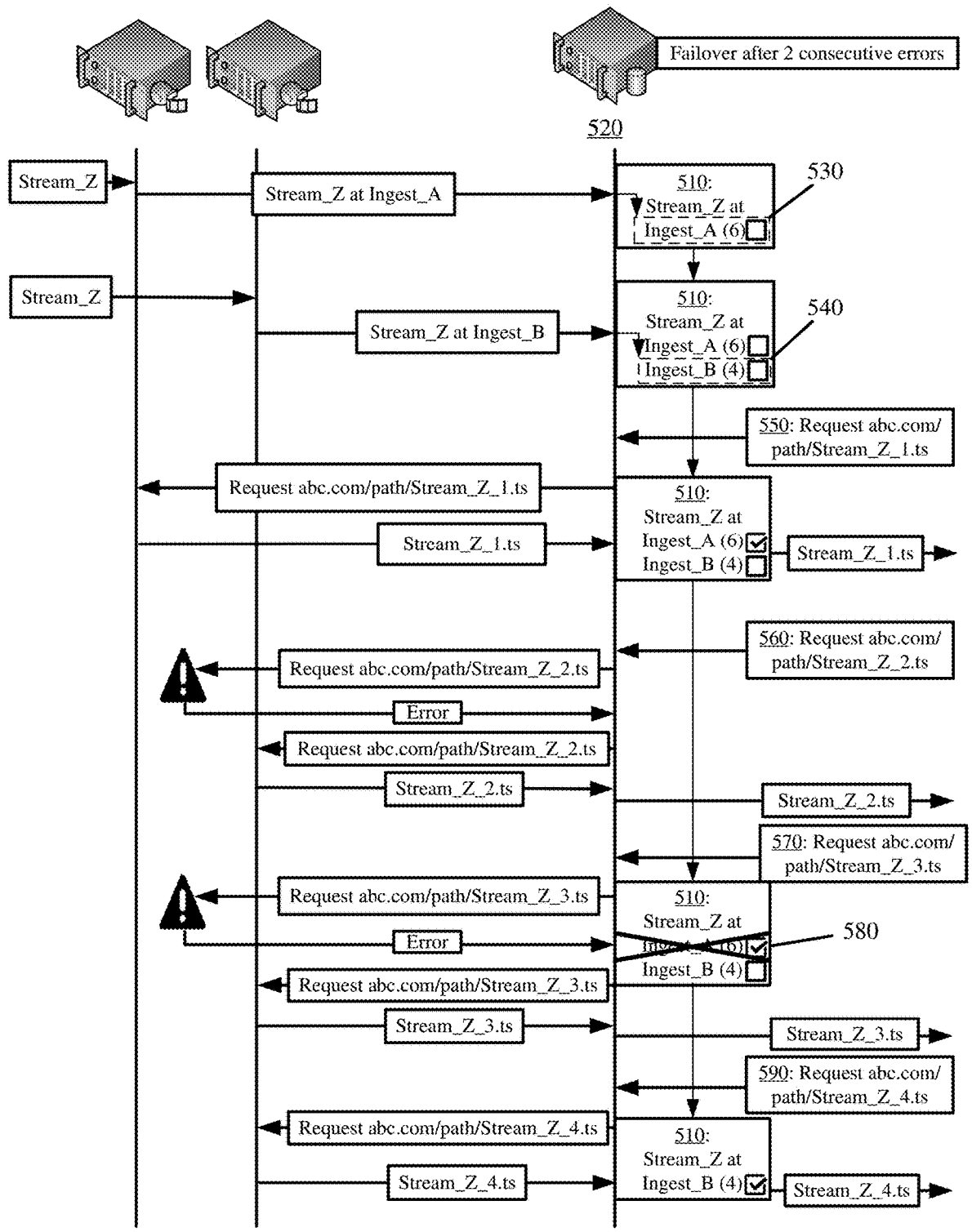
FIG. 5 conceptually illustrates the automatic removal of an entry for a particular media stream from an internal table of a mid-tier device in the absence of an unpublish event for that entry.

FIG. 5 conceptually illustrates the automatic removal of an entry for a particular media stream from an internal table 510 of a mid-tier device 520 in the absence of an unpublish event for that entry. The internal table 510 is shown to include at least a first entry 530 and a second entry 540. The first entry 530 indicates that the particular media stream is available at a first ingest device. The second entry 540 indicates that the particular media stream is also available at a different second ingest device of the same delivery platform. Each entry 530 and 540 also includes a failover activation identifier. The failover activation identifier indicates whether the media stream at the corresponding ingest device is active based on whether the mid-tier device 520 has successfully retrieved one or more parts (e.g., segments or manifests) of the particular media stream from the corresponding ingest device. The first and second entries 530 and 540 may be created in the internal table 510 in response to publish events provided, respectively, by the first and second ingest devices. In this example, the first entry 530 associated with the first ingest device has a greater weight than the second entry 540 associated with the second ingest device, thereby designating the first ingest device as the primary ingest device for the particular media stream. The figure also illustrates the mid-tier device 520 being configured with a threshold of two consecutive errors.

The mid-tier device 520 receives a first request 550 for the particular media stream. This first request 550 is satisfied with a successful retrieval from the first ingest device. In response to the successful retrieval from the first ingest device, the mid-tier device 520 updates the failover activation identifier for the first entry 530. More specifically, the mid-tier device 520 activates the seamless stream failover from the first ingest device in the event of a subsequent failure or error. Activation of the seamless stream failover is shown by the checkmark for the failover activation identifier of the first entry 530.

The mid-tier device 520 then receives two requests 560 and 570 for the particular media stream (whereby the requests for the particular media stream may be intermixed with requests for other media streams or other content and/or services). Based on the internal table 510, the mid-tier device 520 attempts to retrieve the particular media stream parts for the two requests 560 and 570 from the first ingest device.

Each of the attempts for retrieving the particular media stream parts for the two requests 560 and 570 from the first ingest device results in an error (e.g., HTTP 404 "Not Found"). Each error may cause the mid-tier device 520 to seamlessly failover to the secondary second ingest device. The mid-tier device 520 is able to successfully retrieve, in this example, the requested parts of the particular media stream from the second ingest device after the failed attempts to the first ingest device. The mid-tier device 520 absorbs the errors from the failed attempts to the first ingest device and does not return those errors to the requestor sending requests 560 and 570.

After the second consecutive failure or error resulting from a retrieval attempt for the particular media stream to the first ingest device, the mid-tier device 520 deletes (at 580) from its internal table 510, the first entry 530 associating the particular media stream to the first ingest device, even though there was no unpublish event or other stale or deletion messaging from the first ingest device. Thereafter, the second ingest device becomes the primary ingest device for the particular media stream as the second entry 540 for the second ingest device is the only remaining entry for the particular media stream in the interval table 510 of the mid-tier device 520. Consequently, the mid-tier device 520 passes a subsequent request 590 for the particular media stream to the second ingest device, and the first ingest device is passed over or ignored by the mid-tier device 520.

Other mid-tier devices (not shown) may continue selecting the first ingest device as the primary ingest device for the particular media stream if they do not experience two consecutive failures or errors in response to retrieval attempts for parts of the particular media stream from the first ingest device. In some embodiments, the mid-tier device 520 may signal the other mid-tier devices to remove entries associating the first ingest device with the particular media stream from the internal tables of the other mid-tier devices.

The removal rate of stale stream entries can be controlled by increasing or decreasing the number of errors for the threshold upon which entries from the internal table 510 are removed. The removal rate can be further controlled by identifying which errors (e.g., HTTP 404 "Not Found", HTTP 408 "Request Timeout", and HTTP 504 "Gateway Timeout") are counted against the threshold. The threshold can also be defined more granularly to specify, for example, a certain number of errors based on requests of a single client device or multiple client devices. The threshold can also be based on other trackable parameters including performance metrics. For example, the threshold can invoke the automatic removal of an entry from the table when the associated ingest device is unable to respond within a certain amount of time, whether for a single request, some consecutive number of requests, or when the certain amount of time is an average, median, or other computed response time based on response times resulting from a certain number of requests. Different thresholds may be specified for different media streams or different ingest devices. The different thresholds may be used to account for the distance between a mid-tier device and a corresponding ingest device, as well as, the network performance over the pathway between the two devices.

The automatic removal of stale media streams by the mid-tier devices or distribution devices of the delivery platform offloads some of the overhead from the ingest devices (e.g., when the ingest devices were tasked with periodically checking each media stream to determine if the media stream is still active or has become stale, sending unpublish events upon detecting an inactive media stream, etc.). The automatic removal of stale media streams by the mid-tier devices or distribution devices also offloads overhead from the ingest devices that would otherwise result from the mid-tier devices or distribution devices sending requests for stale or unavailable media streams to the ingest devices and the ingest devices having to respond with an error. The automatic removal of stale media stream stops the requesting of media streams from ingest devices at which the media stream becomes unavailable or inaccessible.

Some embodiments further reduce ingest device overhead by shifting manifest generation to the mid-tier devices or distribution devices of the delivery platform. Shifting the generation of media stream manifests from the first tier to the second or third tier of the delivery platform enables distributed manifest generation, and proper generation of a manifest for a media stream with two or more bitrates that are published to two or more ingest devices.

As a result of generating the manifest at the second or third tier of the delivery platform (e.g., mid-tier devices or distribution devices), stream providers no longer need a persistent address (e.g., a persistent Virtual Internet Protocol (VIP) address) to ensure that the different bitrates of a stream are uploaded to the same ingest device. Instead, upload requests from a single media stream provider can be load balanced. The different bitrates of the same media stream can then be ingested by different ingest devices of the delivery platform without losing the multiple bitrate information in the manifest that allows client devices to switch between the different bitrates, and that would be lost if the manifest was generated at the delivery platform first tier (e.g., the ingest devices) and the bitrates of the same stream where uploaded to different ingest devices in the first tier.

The load balancing can be performed at the request resolution layer, including, for example, by DNS servers that resolve upload requests from the stream providers (e.g., encoders or other publishing tools of the stream providers) to the different ingest devices of the delivery platform. The load balancing can also be performed by a load balancing device at an ingest cluster of two or more ingest devices. In this case, upload requests from one or more stream providers may be directed to a particular ingest cluster. A load balancing device at the particular ingest cluster distributes the upload requests equally or proportionally across the ingest devices of the ingest cluster rather than funnel requests for bitrates of a particular stream to one ingest device.

Figure 6:
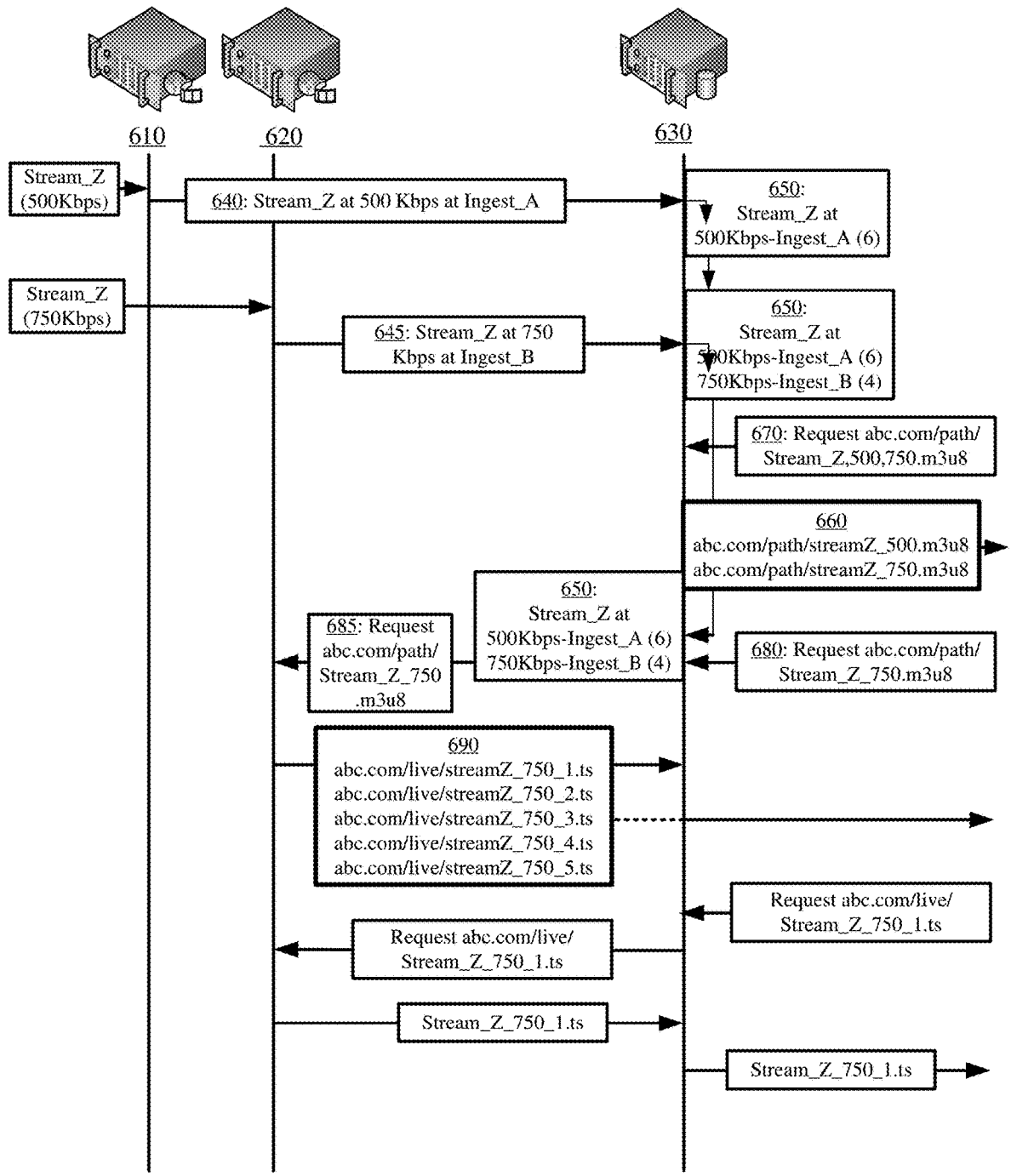
FIG. 6 conceptually illustrates the distributed manifest generation in accordance with some embodiments.

FIG. 6 conceptually illustrates the distributed manifest generation in accordance with some embodiments. In particular, FIG. 6 illustrates the distributed manifest generation producing a complete manifest encompassing bitrate information for a media stream in which the different bitrates of that media stream are published to different ingest devices in the first tier of the delivery platform.

FIG. 6 illustrates a first ingest device 610, a second ingest device 620, and a mid-tier device 630. The first ingest device 610 may be collocated with the second ingest device 620 in the same ingest cluster of a delivery platform, or may be located in a different geographic region or ingest cluster than the second ingest device 620.

The figure illustrates a stream provider uploading a particular media stream that is encoded at a first bitrate (e.g., 500 kilobits per second (Kbps)) to the first ingest device 610. Simultaneously or contemporaneously, the stream provider uploads the particular media stream encoded at a different second bitrate (e.g., 750 Kbps) to the second ingest device 620. The stream provider may use one or two encoders to upload the particular media stream at the different bitrates to the different ingest devices 610 and 620. The different bitrates represent different quality encodings of the particular media stream. In particular, the different bitrates can represent different bandwidth, resolutions, codecs, or other quality parameters of the particular media stream.

In response to the first ingest device 610 receiving the particular media stream encoded at the first bitrate, the first ingest device 610 provides (at 640) a publish event to the mid-tier device 630 and other mid-tier devices (not shown) of the delivery platform. Similarly, in response to the second ingest device 620 receiving the particular media stream encoded at the second bitrate, the second ingest device 620 provides (at 645) a publish event to the mid-tier device 630 and other mid-tier devices of the delivery platform. Each publish event may include an identifier for the ingest device to which the particular media stream is being published, an identifier for the particular media stream being published, and an identifier for the bitrate encoding of the particular media stream being published.

The mid-tier device 630 populates its internal table 650 with information as to the ingest server where each of the bitrates for the particular media stream can be accessed. The mid-tier device 630 also identifies, in this example, that the publish events from the first ingest device 610 and the second ingest device 620 pertain to the same particular media stream, and in particular, to different bitrates of the same media stream. The mid-tier device 630 may generate a master manifest 660 for the particular media stream to include URLs or other identifiers with which each of the bitrates can be accessed from the delivery platform. The master manifest 660 may obscure the specific ingest device location for each bitrate. For instance, the master manifest 660 may list a URL for each bitrate with the URLs having commonality but for a bitrate differentiating identifier. The mid-tier devices may track, in their internal tables (e.g., 650), the different ingest device with which to access each bitrate.

The mid-tier device 630 may create and add to the master manifest 660 over time as it receives the publish events for the different bitrates of the particular media stream from the different ingest devices 610 and 620. Alternatively, the mid-tier device 630 may retain the publish event information in the internal table 650 or in other local memory or storage, and, as shown in FIG. 6, generate the master manifest 660 dynamically in response to a first request for the master manifest.

Some embodiments facilitate the master manifest 660 generation based on the URL used to request the master manifest 660. As shown in FIG. 6, the master manifest 660 is requested (at 670) with a URL having a comma separated format for each of the bitrates of the particular media stream (e.g., "abc.com/path/Stream_Z,500,750.m3u8"). This URL may be specified by the stream provider or delivery platform, and exposed to client devices for initially requesting the particular media stream from the delivery platform. The mid-tier device receiving the comma separated list can then identify an entry from its internal table for each of the bitrates in the comma separated list. A corresponding URL for each identified entry can then be added to the master manifest 660.

The master manifest 660 may have a different URL for each supported bitrate of the requested media stream. Each of the URLs may be used to request a bitrate specific manifest that provides identifiers, addressing, URLs, or other links with which to request one or more segments of the media stream at the bitrate of the bitrate specific manifest. The bitrate specific manifests may be obtained from and generated at the corresponding ingest devices. For example in FIG. 6, the mid-tier device 630 provides the master manifest 660 to a client device that then requests (at 680) a bitrate specific manifest for the particular media stream encoded at the second bitrate. The mid-tier device 630 may issue (at 685) the request for that bitrate specific manifest to the second ingest device 620. The second ingest device 620 generates (in response to receiving the request or before the request is received) the bitrate specific manifest 690 with addressing for requesting one or more segments of the particular media stream encoded at the second bitrate. The second ingest device 620 returns the bitrate specific manifest 690 to the mid-tier device 630. The mid-tier device 630 provides the bitrate specific manifest 690 to the requesting client device (directly or indirectly through a streaming device of the delivery platform).

The mid-tier device 630 may optionally cache the bitrate specific manifest 690 in order to respond to requests for that bitrate specific manifest 690 from other client devices without subsequent retrieval from the second ingest device 620. In some other embodiments, the mid-tier device 630 populates the master manifest 660 with the identifiers, addressing, URLs, or other links with which to request one or more segments of the media stream at each of the available bitrates.

As was noted above, the second tier and third tier of the delivery platform can be combined as one tier. In some such embodiments, a distribution device performs the seamless stream failover, distributed manifest generation, and/or directly distributes, and optionally caches, the media streams (e.g., manifest, segments, metadata, and other parts of the media streams) from the first tier to client devices. Some other embodiments can scale the distributed platform by providing two or more tiers of mid-tier devices, and/or two or more tiers of streaming devices.

Figure 7:
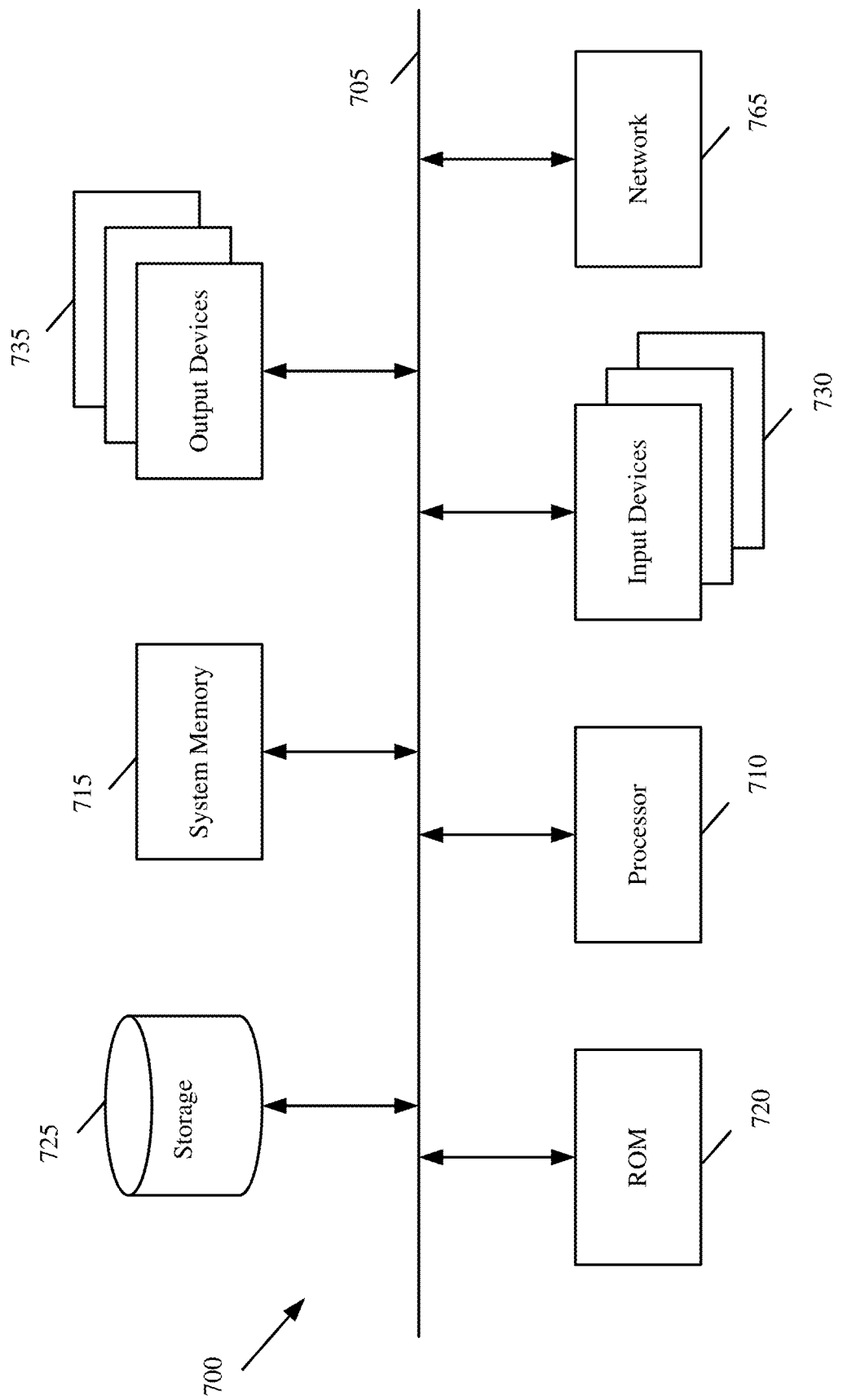
FIG. 7 illustrates a computer system or network device with which some embodiments are implemented.

FIG. 7 illustrates a system with which some embodiments are implemented. Such a system includes various types of computer-readable mediums and interfaces for various other types of computer-readable mediums that implement the various methods, devices, and servers described above (e.g., ingest device, mid-tier device, streaming device, distribution device, etc.). Computer system 700 includes a bus 705, a processor 710, a system memory 715, a read-only memory 720, a permanent storage device 725, input devices 730, and output devices 735.

The bus 705 collectively represents all system, peripheral, and chipset buses that communicatively connect the numerous internal devices of the computer system 700. For instance, the bus 705 communicatively connects the processor 710 with the read-only memory 720, the system memory 715, and the permanent storage device 725. From these various memory units, the processor 710 retrieves instructions to execute and data to process in order to execute the processes of the invention. The processor 710 is a processing device such as a central processing unit, integrated circuit, graphical processing unit, etc.

The read-only-memory (ROM) 720 stores static data and instructions that are needed by the processor 710 and other modules of the computer system. The permanent storage device 725, on the other hand, is a read-and-write memory device. This device is a non-volatile memory unit that stores instructions and data even when the computer system 700 is off. Some embodiments of the invention use a mass-storage device (such as a magnetic or optical disk and its corresponding disk drive) as the permanent storage device 725.

Other embodiments use a removable storage device (such as a flash drive) as the permanent storage device Like the permanent storage device 725, the system memory 715 is a read-and-write memory device. However, unlike storage device 725, the system memory is a volatile read-and-write memory, such as random access memory (RAM). The system memory stores some of the instructions and data that the processor needs at runtime. In some embodiments, the processes are stored in the system memory 715, the permanent storage device 725, and/or the read-only memory 720.

The bus 705 also connects to the input and output devices 730 and 735. The input devices enable the user to communicate information and select commands to the computer system. The input devices 730 include alphanumeric keypads (including physical keyboards and touchscreen keyboards), pointing devices. The input devices 730 also include audio input devices (e.g., microphones, MIDI musical instruments, etc.). The output devices 735 display images generated by the computer system. The output devices include printers and display devices, such as cathode ray tubes (CRT) or liquid crystal displays (LCD).

Finally, as shown in FIG. 7, bus 705 also couples computer 700 to a network 765 through a network adapter (not shown). In this manner, the computer can be a part of a network of computers (such as a local area network ("LAN"), a wide area network ("WAN"), or an Intranet, or a network of networks, such as the Internet).

As mentioned above, the computer system 700 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

I claim:

1. A method comprising:

receiving, from a first ingest device, a message indicating that a particular media stream is being uploaded to the first ingest device;

receiving, from a different second ingest device, a message indicating that the particular media stream is being uploaded to the second ingest device;

receiving a client request from a requesting device, the client request comprising a Uniform Resource Locator (URL) directed to the particular media stream;

issuing a first request to the first ingest device in response to receiving the client request;

issuing a second request to the first ingest device in response to an error resulting from the first request and determining that an upload of at least one segment or manifest of the particular media stream is not complete at the first ingest device; and failing over from the first ingest device to the second ingest device in response to the error resulting from the first request and determining that the upload of the at least one segment or manifest is complete at the first ingest device, wherein failing over comprises withholding the error from the requesting device and issuing the second request to the second ingest device.

2. The method of claim 1 further comprising providing the requesting device with a segment or a manifest of the particular media stream upon receiving the segment or the manifest in response to issuing the first request or the second request.

3. The method of claim 1 further comprising determining that the upload of the at least one segment or manifest is complete as a result of successfully retrieving the at least one segment or manifest from the first ingest device prior to the client request.

4. The method of claim 1 further comprising providing the requesting device with the error in response to receiving the error from the first ingest device and the second ingest device after successfully retrieving one segment or manifest from at least one of the first ingest device and the second ingest device.

5. The method of claim 1 further comprising removing availability of the particular media stream at the first ingest device in response to a threshold number of consecutive errors resulting from at least the first and second requests issued to the first ingest device, and wherein said removing occurs prior to receiving an unpublish event for the particular media stream from the first ingest device.

6. The method of claim 1, wherein the message from the first ingest device indicates availability of a first bitrate of the particular media stream at the first ingest device, and wherein the message from the second ingest device indicates availability of a different second bitrate of the particular media stream at the second ingest device.

7. The method of claim 6 further comprising providing a manifest for the particular media stream in response to a manifest request from the requesting device, wherein providing the manifest comprises generating the manifest with a first entry for the first bitrate based on the message from the first ingest device, and populating the manifest with a second entry for the second bitrate based on the message from the second ingest device.

8. The method of claim 1 further comprising generating a master manifest with a first bitrate and a second bitrate for the particular media stream based on the message from the first ingest device indicating availability of the first bitrate at the first ingest device and the message from the second ingest device indicating availability of the second bitrate at the second ingest device.

9. The method of claim 8 further comprising retrieving a first bitrate specific manifest for the particular media stream from the first ingest device, retrieving a second bitrate specific manifest for the particular stream from the second ingest device, and wherein the first bitrate specific manifest is generated by the first ingest device, the second bitrate specific manifest is generated by the second ingest device, and the master manifest is generated by a distribution device located between the requesting device and each of the first ingest device and the second ingest device.

10. The method of claim 8 further comprising distributing a segment of the particular media stream at the first bitrate from the first ingest device, and distributing a segment of the particular media segment at the second bitrate from the second ingest device.

11. The method of claim 1 further comprising selecting in response to receiving the client request, the first ingest device over the second ingest device based on a greater weight that is assigned to the first ingest device than the second ingest device.

12. The method of claim 1 further comprising selecting in response to receiving the client request, the first ingest device over the second ingest device based closer proximity to the first ingest device than the second ingest device.

13. The method of claim 1 further comprising selecting in response to receiving the client request, the first ingest device over the second ingest device based faster performance from the first ingest device than the second ingest device.

14. The method of claim 1, wherein the error identifies availability of the particular media stream and unavailability of a specific segment or manifest of the particular media stream at the first ingest device.

15. A device of a media stream delivery platform, the device comprising:
  a non-transitory computer-readable medium storing a set of processor-executable instructions; and
  one or more processors configured to execute the set of processor-executable instructions, wherein executing the set of processor-executable instructions causes the one or more processors to:
    receive, from a first ingest device, a message indicating that a particular media stream is being uploaded to the first ingest device;
    receive, from a different second ingest device, a message indicating that the particular media stream is being uploaded to the second ingest device;
    receive a client request from a requesting device, the client request comprising a Uniform Resource Locator (URL) directed to the particular media stream;
    issue a first request to the first ingest device in response to receiving the client request;
    issue a second request to the first ingest device in response to an error resulting from the first request and determining that an upload of at least one segment or manifest of the particular media stream is not complete at the first ingest device; and
    fail over from the first ingest device to the second ingest device in response to the error resulting from the first request and determining that the upload of the at least one segment or manifest is complete at the first ingest device, wherein failing over comprises withholding the error from the requesting device and issuing the second request to the second ingest device.

16. The device of claim 15, wherein the processor-executable instructions further include processor-executable instructions to remove availability of the particular media stream at the first ingest device in response to a threshold number of consecutive errors resulting from at least the first and second requests issued to the first ingest device, and wherein said removing occurs prior to receiving an unpublish event for the particular media stream from the first ingest device.

17. A non-transitory computer-readable medium, storing a set of processor-executable instructions, which, when executed by one or more processors of a device associated with a delivery platform, cause the one or more processors to:
  receive, from a first ingest device, a message indicating that a particular media stream is being uploaded to the first ingest device;
  receive, from a different second ingest device, a message indicating that the particular media stream is being uploaded to the second ingest device;
  receive a client request from a requesting device, the client request comprising a Uniform Resource Locator (URL) directed to the particular media stream;
  issue a first request to the first ingest device in response to receiving the client request;
  issue a second request to the first ingest device in response to an error resulting from the first request and determining that an upload of at least one segment or manifest of the particular media stream is not complete at the first ingest device; and
  fail over from the first ingest device to the second ingest device in response to the error resulting from the first request and determining that the upload of the at least one segment or manifest is complete at the first ingest device, wherein failing over comprises withholding the error from the requesting device and issuing the second request to the second ingest device.

18. The non-transitory computer-readable medium of claim 17, wherein the processor-executable instructions further include processor-executable instructions to provide a manifest indicating availability of the particular media stream at a first bitrate based on the message from the first ingest device, and availability of the particular media stream at a second bitrate based the message from the second ingest device.

* * * * *